United States Patent
Lee et al.

(10) Patent No.: US 9,541,165 B2
(45) Date of Patent: Jan. 10, 2017

(54) POWER TRANSMITTING APPARATUS FOR HYBRID ELECTRIC VEHICLE

(71) Applicant: Hyundai Motor Company, Seoul (KR)

(72) Inventors: Kyeonghun Lee, Seoul (KR); Jongsool Park, Hwaseong-si (KR); Suengho Lee, Seoul (KR); Changyeon Cho, Seoul (KR); Jongmin Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 14/535,799

(22) Filed: Nov. 7, 2014

(65) Prior Publication Data

US 2015/0167785 A1    Jun. 18, 2015

(30) Foreign Application Priority Data

Dec. 18, 2013 (KR) .......................... 10-2013-0158819

(51) Int. Cl.
*F16H 3/08* (2006.01)
*F16H 3/00* (2006.01)
F16D 21/06 (2006.01)
F16H 3/093 (2006.01)

(52) U.S. Cl.
CPC ............... *F16H 3/006* (2013.01); *F16D 21/06* (2013.01); *F16H 2003/0931* (2013.01); *F16H 2200/0056* (2013.01); *Y02T 10/76* (2013.01); *Y10S 903/919* (2013.01); *Y10T 74/19014* (2015.01)

(58) Field of Classification Search
CPC .. F16H 3/006; F16H 2003/0931; F16H 3/091; F16H 47/02

USPC ................... 74/330, 331, 333, 340
See application file for complete search history.

(56) References Cited

U.S. PATENT DOCUMENTS

| | | | | |
|---|---|---|---|---|
| 7,225,696 | B2 * | 6/2007 | Gitt | F16H 3/006 74/329 |
| 7,604,565 | B2 * | 10/2009 | Lee | B60K 6/36 477/3 |
| 8,499,656 | B2 * | 8/2013 | Ross | F16H 3/006 74/330 |
| 9,180,872 | B2 * | 11/2015 | Lee | B60W 20/40 |
| 9,273,757 | B2 * | 3/2016 | Michel | F16H 3/006 |

(Continued)

FOREIGN PATENT DOCUMENTS

| JP | 4361794 B2 | 11/2009 |
|---|---|---|
| JP | 4566199 B2 | 10/2010 |

(Continued)

*Primary Examiner* — Ha D Ho
(74) *Attorney, Agent, or Firm* — Morgan, Lewis & Bockius LLP

(57) ABSTRACT

A power transmitting apparatus may include: an input device including a motor shaft selectively connected to an engine, a first input shaft selectively connected to the motor shaft and provided with at least one input gear fixedly disposed thereon, and a second input shaft disposed without rotational interference with the first input shaft and provided with at least one input gear fixedly disposed thereon; a motor/generator disposed on the motor shaft of the input device and operated as a motor or a generator; a selectively connecting device adapted to selectively connect the motor shaft of the input device to the engine, the first input shaft, or the second input shaft; and a speed output device changing torque input from the first and second input shafts of the input device and outputting the changed torque.

18 Claims, 2 Drawing Sheets

(56) References Cited

U.S. PATENT DOCUMENTS

| | | | |
|---|---|---|---|
| 9,297,443 B2* | 3/2016 | Lee | F16H 3/006 |
| 2006/0266141 A1* | 11/2006 | Ogami | F16H 3/006 74/325 |
| 2006/0266144 A1 | 11/2006 | Schafer et al. | |
| 2007/0199393 A1* | 8/2007 | Hattori | F16H 3/006 74/331 |
| 2010/0125020 A1 | 5/2010 | Ikegami et al. | |
| 2011/0023638 A1* | 2/2011 | Mohlin | F16H 3/006 74/330 |
| 2012/0115677 A1 | 5/2012 | Sakai | |

FOREIGN PATENT DOCUMENTS

| | | |
|---|---|---|
| JP | 2010-285012 A | 12/2010 |
| JP | 2011-240855 A | 12/2011 |
| KR | 10-2005-0115639 A | 12/2005 |

* cited by examiner

FIG. 2

| Speed | CL1 | CL2 | CL3 | SL1 | | | SL2 | | | SL3 | | | SL4 | | |
|---|---|---|---|---|---|---|---|---|---|---|---|---|---|---|---|
| | | | | 1st | N | 5th | 2nd | N | 4th | 3rd | N | 7th | 6th | N | |
| EV R | ● | | | ● | | | | | | | | | | | Stopping engine, motor rotates inversely |
| N | | | ● | | | | | | | | | | | | - |
| D1 | ● | | ● | ● | | | | | | | | | | | Engine operates (motor assists torque) |
| D2 | | ● | ● | | | | ● | | | | | | | | |
| D3 | ● | | ● | | | | | | | ● | | | | | |
| D4 | | ● | ● | | | | | | ● | | | | | | |
| D5 | ● | | ● | | | ● | | | | | | | | | |
| D6 | | ● | ● | | | | | | | | | | ● | | |
| D7 | ● | | ● | | | | | | | | | ● | | | |
| EV D1 | ● | | | ● | | | | | | | | | | | Stopping engine |
| EV D2 | | ● | | | | | ● | | | | | | | | |
| EV D3 | ● | | | | | | | | | ● | | | | | |
| EV D4 | | ● | | | | | | | ● | | | | | | |
| EV D5 | ● | | | | | ● | | | | | | | | | |
| EV D6 | | ● | | | | | | | | | | | ● | | |
| EV D7 | ● | | | | | | | | | | | ● | | | |

//  # POWER TRANSMITTING APPARATUS FOR HYBRID ELECTRIC VEHICLE

CROSS-REFERENCE TO RELATED APPLICATION

The present application claims priority to Korean Patent Application No. 10-2013-0158819 filed on Dec. 18, 2013, the entire contents of which is incorporated herein for all purposes by this reference.

BACKGROUND OF THE INVENTION

Field of the Invention

The present invention relates to a power transmitting apparatus for a hybrid electric vehicle. More particularly, the present invention relates to a power transmitting apparatus for a hybrid electric vehicle that enhances fuel economy and acceleration performance due to regenerative braking by adding a motor/generator to a double clutch transmission and can achieve a reverse speed by inverse rotation of the motor/generator.

Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system so as to meet exhaust regulation of countries and improve fuel consumption performance. In order to improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel so as to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmitting apparatus for a hybrid electric vehicle having advantages of improving fuel economy and acceleration performance by adding a motor/generator to a double clutch transmission and achieving a reverse speed by inverse rotation of the motor/generator.

A power transmitting apparatus for a hybrid electric vehicle according to an exemplary embodiment of the present invention may include: an input device including a motor shaft selectively connected to an engine, a first input shaft selectively connected to the motor shaft and provided with at least one input gear fixedly disposed thereon, and a second input shaft disposed without rotational interference with the first input shaft and provided with at least one input gear fixedly disposed thereon; a motor/generator disposed on the motor shaft of the input device and operated as a motor or a generator; a selectively connecting device adapted to selectively connect the motor shaft of the input device to the engine, the first input shaft, or the second input shaft; and a speed output device changing torque input from the first and second input shafts of the input device and outputting the changed torque.

At least one input gear fixedly disposed on the first input shaft may be related to achieving a reverse speed and odd-numbered speeds, and at least one input gear fixedly disposed on the second input shaft may be related to achieving even-numbered speeds.

A first input gear for achieving a seventh forward speed, a second input gear for achieving a first forward speed or a reverse speed, a third input gear for achieving a third forward speed, and a fourth input gear for achieving a fifth forward speed may be fixedly disposed on the first input shaft, and a fifth input gear for achieving a fourth forward speed or a sixth forward speed and a sixth input gear for achieving a second forward speed may be fixedly disposed on the second input shaft.

The motor/generator may include a rotor connected to the motor shaft and a stator disposed at a radial exterior of the rotor and fixed to a transmission housing.

The selectively connecting device may include: a first clutch selectively connecting the motor shaft with the first input shaft; a second clutch selectively connecting the motor shaft with the second input shaft; and a third clutch selectively connecting the motor shaft with the engine.

The speed output device may include: a first speed output unit including a first output shaft disposed in parallel with the first and second input shafts, at least one speed gear engaged with the at least one input gear on the first input shaft or the second input shaft and rotatably disposed on the first output shaft, a first output gear fixedly disposed on the first output shaft and outputting torque of the first output shaft, and first and second synchronizers disposed on the first output shaft and selectively connecting the at least one speed gear to the first output shaft; and a second speed output unit including a second output shaft disposed in parallel with the first and second input shafts, at least one speed gear engaged with the at least one input gear on the first input shaft or the second input shaft and rotatably disposed on the second output shaft, a second output gear fixedly disposed on the second output shaft and outputting torque of the second output shaft, and third and fourth synchronizers disposed on the second output shaft and selectively connecting the at least one speed gear to the second output shaft.

A first/reverse speed gear engaged with the second input gear, a fifth speed gear engaged with the fourth input gear, a fourth speed gear engaged with the fifth input gear, and a second speed gear engaged with the sixth input gear may be rotatably disposed on the first output shaft, and a seventh speed gear engaged with the first input gear, a third speed gear engaged with the third input gear, and a sixth speed gear engaged with the fifth input gear may be rotatably disposed on the second output shaft.

The first synchronizer may selectively connect the first/reverse speed gear or the fifth speed gear to the first output shaft.

The second synchronizer may selectively connect the fourth speed gear or the second speed gear to the first output shaft.

The third synchronizer may selectively connect the seventh speed gear or the third speed gear to the second output shaft.

The fourth synchronizer may selectively connect the sixth speed gear to the second output shaft.

The first input shaft may be a hollow shaft and the second input shaft may penetrate through the first input shaft.

A power transmitting apparatus for a hybrid electric vehicle according to another exemplary embodiment of the present invention may include: an input device including a motor shaft selectively connected to an engine, a first input shaft selectively connected to the motor shaft and provided with at least one input gear fixedly disposed thereon, and a second input shaft disposed without rotational interference with the first input shaft and provided with at least one input gear fixedly disposed thereon; a motor/generator disposed on the motor shaft of the input device and operated as a motor or a generator; a selectively connecting device including a first clutch selectively connecting the motor shaft with the first input shaft, a second clutch selectively connecting the motor shaft with the second input shaft, and a third clutch selectively connecting the motor shaft with the engine; and a speed output device changing torque input from the first and second input shafts of the input device and outputting the changed torque.

A first input gear for achieving a seventh forward speed, a second input gear for achieving a first forward speed or a reverse speed, a third input gear for achieving a third forward speed, and a fourth input gear for achieving a fifth forward speed may be fixedly disposed on the first input shaft, and a fifth input gear for achieving a fourth forward speed or a sixth forward speed and a sixth input gear for achieving a second forward speed may be fixedly disposed on the second input shaft.

The speed output device may include: a first speed output unit including a first output shaft disposed in parallel with the first and second input shafts, at least one speed gear engaged with the at least one input gear on the first input shaft or the second input shaft and rotatably disposed on the first output shaft, a first output gear fixedly disposed on the first output shaft and outputting torque of the first output shaft, and first and second synchronizers disposed on the first output shaft and selectively connecting the at least one speed gear to the first output shaft; and a second speed output unit including a second output shaft disposed in parallel with the first and second input shafts, at least one speed gear engaged with the at least one input gear on the first input shaft or the second input shaft and rotatably disposed on the second output shaft, a second output gear fixedly disposed on the second output shaft and outputting torque of the second output shaft, and third and fourth synchronizers disposed on the second output shaft and selectively connecting the at least one speed gear to the second output shaft.

A first/reverse speed gear engaged with the second input gear, a fifth speed gear engaged with the fourth input gear, a fourth speed gear engaged with the fifth input gear, and a second speed gear engaged with the sixth input gear may be rotatably disposed on the first output shaft, and a seventh speed gear engaged with the first input gear, a third speed gear engaged with the third input gear, and a sixth speed gear engaged with the fifth input gear may be rotatably disposed on the second output shaft.

The first synchronizer may selectively connect the first/reverse speed gear or the fifth speed gear to the first output shaft.

The second synchronizer may selectively connect the fourth speed gear or the second speed gear to the first output shaft.

The third synchronizer may selectively connect the seventh speed gear or the third speed gear to the second output shaft.

The fourth synchronizer may selectively connect the sixth speed gear to the second output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of a power transmitting apparatus according to an exemplary embodiment of the present invention.

Figure 1:
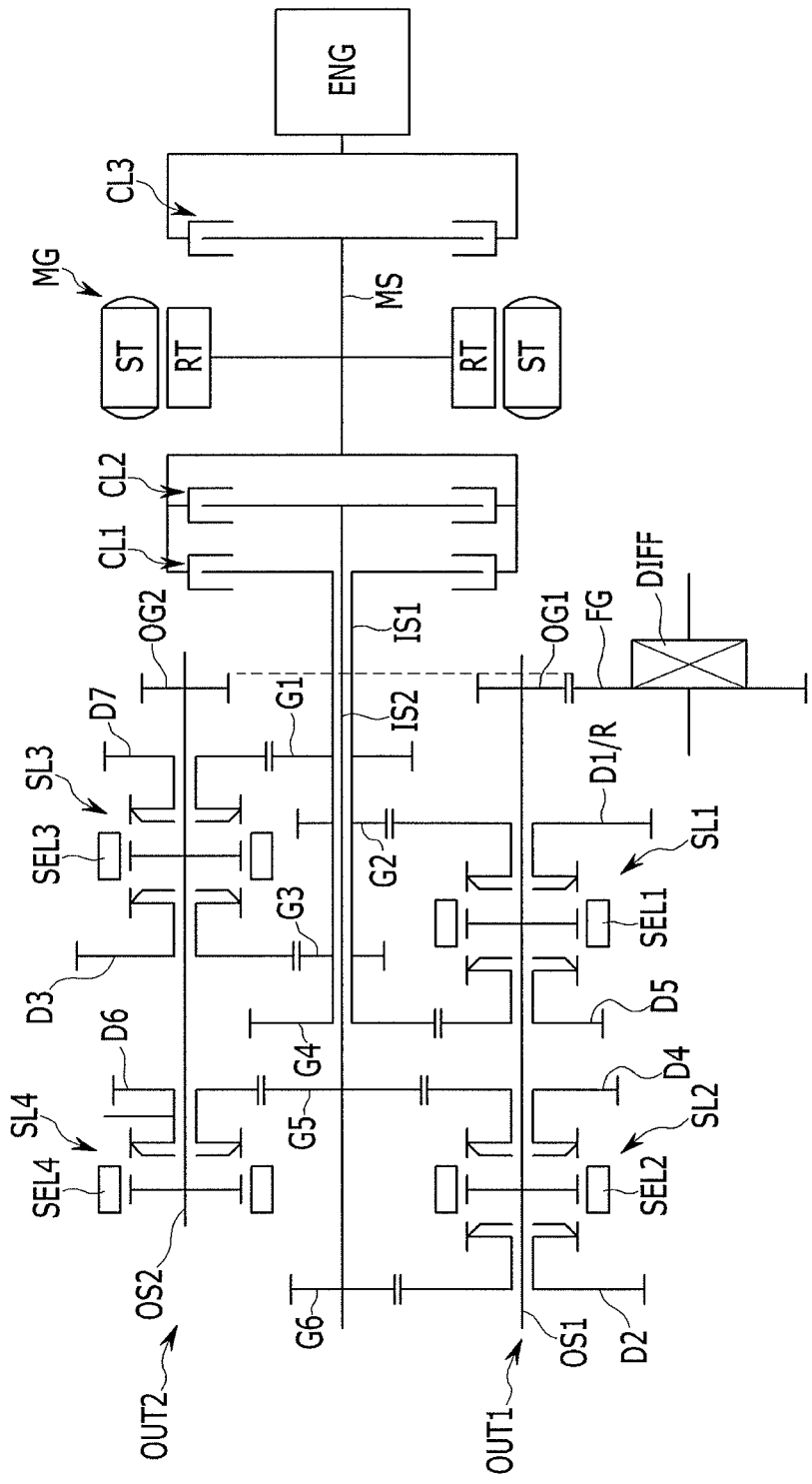
FIG. 1 is a schematic diagram of a power transmitting apparatus according to an exemplary embodiment of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmitting apparatus according to an exemplary embodiment of the present invention.

Referring to FIG. 1, a power transmitting apparatus for a hybrid electric vehicle according to an exemplary embodiment of the present invention includes an input device, a motor/generator, a selectively connecting device, and a speed output device.

The input device includes a motor shaft MS and first and second input shafts IS1 and IS2. The motor shaft MS and the first and second input shafts IS1 and IS2 are disposed on the same axis.

The motor shaft MS is connected to an output side of the engine ENG.

The first input shaft IS1 is a hollow shaft and has an end portion selectively connected to the motor shaft MS.

The second input shaft IS2 penetrates through the first input shaft IS1 without rotational interference and has an end portion selectively connected to the motor shaft MS.

A motor/generator MG operating as a motor or a generator is disposed on the motor shaft MS.

The motor/generator MG includes a stator ST fixed to a transmission housing and a rotor RT rotatably supported in the stator ST, and the rotor RT is directly connected to the motor shaft MS.

Therefore, the motor/generator MG may be operated as the generator using torque of the engine ENG and may charge a battery by generated electrical energy, or may be operated as the motor for generating driving torque.

In addition, the motor/generator MG rotates inversely (i.e., rotating direction of the motor/generator is opposite to that of the engine ENG) and can achieve a reverse speed.

First, second, third, and fourth input gears G1, G2, G3, and G4 are fixedly disposed on the first input shaft IS1 with predetermined distances in a named sequence.

Fifth and sixth input gears G5 and G6 are fixedly disposed on the second input shaft IS2 with a predetermined distance. The fifth and sixth input gears G5 and G6 are positioned at the other end portion of the second input shaft IS2 penetrating through the first input shaft IS1, and disposed in a named sequence.

The first, the second, third, fourth, fifth, and sixth input gears G1, G2, G3, G4, G5, and G6 are input gears operating at each speed. That is, the first input gear G1 is an input gear for achieving a seventh forward speed, the second input gear G2 is an input gear for achieving a first forward speed and the reverse speed, the third input gear G3 is an input gear for achieving a third forward speed, the fourth input gear G4 is an input gear for achieving a fifth forward speed, the fifth input gear G5 is an input gear for achieving a fourth forward speed and a sixth forward speed, and the sixth input gear G6 is an input gear for achieving a second forward speed.

That is, input gears for achieving odd-numbered speeds are disposed on the first input shaft IS1, and input gears for achieving even-numbered speeds are disposed on the second input shaft IS2.

The selectively connecting device includes first, second, and third clutches CL1, CL2, and CL3.

The first clutch CL1 selectively connects the motor shaft MS with the first input shaft IS1, the second clutch CL2 selectively connects the motor shaft MS with the second input shaft IS2, and the third clutch CL3 selectively connects the output side of the engine ENG with the motor shaft MS.

The first, second, and third clutches CL1, CL2, and CL3 are conventional multi-plate clutches of wet type or of dry type.

The speed output device is adapted to receive torque from each input gear of the input device, convert the torque, and output the converted torque. The speed output device includes first and second speed output units OUT1 and OUT2 disposed in parallel with and apart from the first and second input shafts IS1 and IS2.

The first speed output unit OUT1 includes a first output shaft OS1 disposed in parallel with and apart from the first and second input shafts IS1 and IS2, first/reverse speed gear D1/R and second, fourth, and fifth speed gears D2, D4, and D5, a first synchronizer SL1 disposed between the first/reverse speed gear D1/R and the fifth speed gear D5 and selectively connecting the first/reverse speed gear D1/R or the fifth speed gear D5 to the first output shaft OS1, and a second synchronizer SL2 disposed between the fourth speed gear D4 and the second speed gear D2 and selectively connecting the fourth speed gear D4 or the second speed gear D2 to the first output shaft OS1.

Here, the first synchronizer SL1 is disposed on one side portion of the first output shaft OS1 and the second synchronizer SL2 is disposed on the other side portion of the first output shaft OS1.

The first/reverse speed gear D1/R is engaged with the second input gear G2 and the fifth speed gear D5 is engaged with the fourth input gear G4.

The fourth speed gear D4 is engaged with the fifth input gear G5 and the second speed gear D2 is engaged with the sixth input gear G6.

In addition, the torque converted by the first speed output unit OUT1 is transmitted to a differential apparatus DIFF through a first output gear OG1 fixedly disposed on one end portion or the other end portion of the first output shaft OS1 and a final reduction gear FG engaged with the first output gear OG1.

The second speed output unit OUT2 includes a second output shaft OS2 disposed in parallel with and apart from the first and second input shafts IS1 and IS2, third, sixth, and seventh speed gears D3, D6, and D7, a third synchronizer SL3 disposed between the seventh speed gear D7 and the third speed gear D3 and selectively connecting the seventh speed gear D7 or the third speed gear D3 to the second output shaft OS2, and a fourth synchronizer SL4 selectively connecting the sixth speed gear D6 to the second output shaft OS2.

Here, the third synchronizer SL3 is disposed on one side portion of the second output shaft OS2 and the fourth synchronizer SL4 is disposed on the other side portion of the second output shaft OS2.

The seventh speed gear D7 is engaged with the first input gear G1 and the third speed gear D3 is engaged with the third input gear G3.

The sixth speed gear D6 is engaged with the fifth input gear G5.

In addition, the torque converted by the second speed output unit OUT2 is transmitted to the differential apparatus DIFF through a second output gear OG2 fixedly disposed on one end portion or the other end portion of the second output shaft IS2 and the final reduction gear FD engaged with the second output gear OG2.

Since the first, second, third, and fourth synchronizers SL1, SL2, SL3, and SL4 are well known to a person of an ordinary skill in the art, detailed description thereof will be omitted. In addition, sleeves SEL1, SEL2, SEL3, and SEL4 applied respectively to the first, second, third, and fourth synchronizers SL1, SL2, SL3, and SL4, as well known to a person of an ordinary skill in the art, are operated by additional actuators and the actuators are controlled by a transmission control unit.

FIG. 2 is an operational chart of a power transmitting apparatus according to an exemplary embodiment of the present invention.

[EV Reverse Speed]

The engine is stopped and the first output shaft OS1 is operably connected to the first/reverse speed gear D1/R through the first sleeve SEL1 of the first synchronizer SL1 at an electric vehicle (EV) reverse speed. After that, if the first clutch CL1 is operated, the EV reverse speed is achieved.

The reverse speed is one speed at the EV mode and is achieved by inverse rotation of the motor/generator MG.

[First Forward Speed]

The first forward speed is achieved by the torque of the engine ENG. That is, after that the first/reverse speed gear D1/R is operably connected to the first output shaft OS1 through the first sleeve SEL1 of the first synchronizer SL1, the first clutch CL1 and the third clutch CL3 are operated. Therefore, the first forward speed is achieved.

[Second Forward Speed]

If a vehicle speed increases at the first forward speed and shift to the second forward speed is necessary, the second speed gear D2 are operably connected to the first output shaft OS1 through the sleeve SEL2 of the second synchronizer SL2. After that, if the first clutch CL1 is released and the second clutch CL2 is operated, the second forward speed is achieved.

In addition, after the shift to the second forward speed is completed, the first sleeve SEL1 of the first synchronizer SL1 moves to a neutral position.

[Third Forward Speed]

If the vehicle speed increases at the second forward speed and a shift to the third forward speed is necessary, the third speed gear D3 is operably connected to the second output shaft OS2 through the third sleeve SEL3 of the third synchronizer SL3. After that, if the second clutch CL2 is released and the first clutch CL1 is operated, the third forward speed is achieved.

After the shift to the third forward speed is completed, the second sleeve SEL2 of the second synchronizer SL2 moves to a neutral position.

[Fourth Forward Speed]

If the vehicle speed increases at the third forward speed and a shift to the fourth forward speed is necessary, the fourth speed gear D4 is operably connected to the first output shaft OS1 through the second sleeve SEL2 of the second synchronizer SL2. After that, if the first clutch CL1 is released and the second clutch CL2 is operated, the fourth forward speed is achieved.

After the shift to the fourth forward speed is completed, the third sleeve SEL3 of the third synchronizer SL3 moves to a neutral position.

[Fifth Forward Speed]

If the vehicle speed increases at the fourth forward speed and a shift to the fifth forward speed is necessary, the fifth speed gear D5 is operably connected to the first output shaft OS1 through the first sleeve SEL1 of the first synchronizer SL1. After that, if the second clutch CL2 is released and the first clutch CL1 is operated, the fifth forward speed is achieved.

After the shift to the fifth forward speed is completed, the second sleeve SEL2 of the second synchronizer SL2 moves to the neutral position.

[Sixth Forward Speed]

If the vehicle speed increases at the fifth forward speed and a shift to the sixth forward speed is necessary, the sixth speed gear D6 is operably connected to the second output shaft OS2 through the fourth sleeve SEL4 of the fourth synchronizer SL4. After that, if the first clutch CL1 is released and the second clutch CL2 is operated, the sixth forward speed is achieved.

After the shift to the sixth forward speed is completed, the first sleeve SEL1 of the first synchronizer SL1 moves to the neutral position.

[Seventh Forward Speed]

If the vehicle speed increases at the sixth forward speed and a shift to the seventh forward speed is necessary, the seventh speed gear D7 is operably connected to the second output shaft OS2 through the third sleeve SEL3 of the third synchronizer SL3. After that, if the second clutch CL2 is released and the first clutch CL1 is operated, the seventh forward speed is achieved.

After the shift to the seventh forward speed is completed, the sleeve SEL4 of the fourth synchronizer SL4 moves to a neutral position.

During the shifting processes, the driving torque of the motor/generator MG may be used as auxiliary torque for the engine ENG. In addition, when the vehicle is driven by the torque of the engine ENG, the rotor RT of the motor/generator MG always rotates. Therefore, the motor/generator MG generates electric energy and the generated electrical energy is used to charge the battery.

In addition, since the power transmitting apparatus according to the exemplary embodiment of the present invention can achieve the EV mode, seven forward speeds and one reverse speed may be achieved by the torque of the motor/generator MG in a state that the engine ENG is stopped and the third clutch CL3 is released.

The power transmitting apparatus for the hybrid electric vehicle according to the exemplary embodiment of the present invention can achieve seven forward speeds by the torque of the engine.

In addition, seven forward speed and one reverse speed may be achieved only by the torque of the motor/generator at the EV mode where the engine is stopped. Therefore, fuel economy may be greatly enhanced at a low-speed driving region.

In addition, when the vehicle runs by the torque of the engine, the motor/generator can supply auxiliary torque. Therefore, acceleration performance may be improved.

Since the reverse speed is achieved by rotating the motor/generator MG inversely, additional reverse speed devices are not necessary. Therefore, a length of the transmission may be shortened and mountability may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmitting apparatus for a hybrid electric vehicle comprising:
   an input device including a motor shaft selectively connected to an engine, a first input shaft selectively connected to the motor shaft and provided with at least one input gear fixedly disposed thereon, and a second input shaft disposed without rotational interference with the first input shaft and provided with at least one input gear fixedly disposed thereon;
   a motor/generator disposed on the motor shaft of the input device and operated as a motor or a generator;
   a selectively connecting device adapted to selectively connect the motor shaft of the input device to the engine, the first input shaft, or the second input shaft; and
   a speed output device changing torque input from the first and second input shafts of the input device and outputting a changed torque,
   wherein a first input gear for achieving a seventh forward speed, a second input gear for achieving a first forward speed or a reverse speed, a third input gear for achieving a third forward speed, and a fourth input gear for achieving a fifth forward speed are fixedly disposed on the first input shaft, and
   a fifth input gear for achieving a fourth forward speed or a sixth forward speed and a sixth input gear for achieving a second forward speed are fixedly disposed on the second input shaft.

2. The power transmitting apparatus of claim 1, wherein the at least one input gear fixedly disposed on the first input shaft is related to achieving a reverse speed and odd-numbered speeds, and
   the at least one input gear fixedly disposed on the second input shaft is related to achieving even-numbered speeds.

3. The power transmitting apparatus of claim 1, wherein the motor/generator includes a rotor connected to the motor shaft and a stator disposed at a radial exterior of the rotor and fixed to a transmission housing.

4. The power transmitting apparatus of claim 1, wherein the selectively connecting device comprises:
   a first clutch selectively connecting the motor shaft with the first input shaft;
   a second clutch selectively connecting the motor shaft with the second input shaft; and
   a third clutch selectively connecting the motor shaft with the engine.

5. The power transmitting apparatus of claim 1, wherein the speed output device comprises:
   a first speed output unit including a first output shaft disposed in parallel with the first and second input shafts, at least one speed gear engaged with the at least one input gear on the first input shaft or the second input shaft and rotatably disposed on the first output shaft, a first output gear fixedly disposed on the first output shaft and outputting torque of the first output shaft, and first and second synchronizers disposed on the first output shaft and selectively connecting the at least one speed gear to the first output shaft; and
   a second speed output unit including a second output shaft disposed in parallel with the first and second input shafts, at least one speed gear engaged with the at least one input gear on the first input shaft or the second input shaft and rotatably disposed on the second output shaft, a second output gear fixedly disposed on the second output shaft and outputting torque of the second output shaft, and third and fourth synchronizers disposed on the second output shaft and selectively connecting the at least one speed gear to the second output shaft.

6. The power transmitting apparatus of claim 5,
   wherein a first/reverse speed gear engaged with a second input gear, a fifth speed gear engaged with a fourth input gear, a fourth speed gear engaged with a fifth input gear, and a second speed gear engaged with a sixth input gear are rotatably disposed on the first output shaft, and
   wherein a seventh speed gear engaged with a first input gear, a third speed gear engaged with a third input gear, and a sixth speed gear engaged with a fifth input gear are rotatably disposed on the second output shaft.

7. The power transmitting apparatus of claim 6, wherein the first synchronizer selectively connects the first/reverse speed gear or the fifth speed gear to the first output shaft.

8. The power transmitting apparatus of claim 6, wherein the second synchronizer selectively connects the fourth speed gear or the second speed gear to the first output shaft.

9. The power transmitting apparatus of claim 6, wherein the third synchronizer selectively connects the seventh speed gear or the third speed gear to the second output shaft.

10. The power transmitting apparatus of claim 6, wherein the fourth synchronizer selectively connects the sixth speed gear to the second output shaft.

11. The power transmitting apparatus of claim 1, wherein the first input shaft is a hollow shaft and the second input shaft penetrates through the first input shaft.

12. The power transmitting apparatus of claim 1, wherein the speed output device comprises:
    a first speed output unit including a first output shaft disposed in parallel with the first and second input shafts, at least one speed gear engaged with the at least one input gear on the first input shaft or the second input shaft and rotatably disposed on the first output shaft, a first output gear fixedly disposed on the first output shaft and outputting torque of the first output shaft, and first and second synchronizers disposed on the first output shaft and selectively connecting the at least one speed gear to the first output shaft; and
    a second speed output unit including a second output shaft disposed in parallel with the first and second input shafts, at least one speed gear engaged with the at least one input gear on the first input shaft or the second input shaft and rotatably disposed on the second output shaft, a second output gear fixedly disposed on the second output shaft and outputting torque of the second output shaft, and third and fourth synchronizers disposed on the second output shaft and selectively connecting the at least one speed gear to the second output shaft.

13. The power transmitting apparatus of claim 12,
    wherein a first/reverse speed gear engaged with the second input gear, a fifth speed gear engaged with the fourth input gear, a fourth speed gear engaged with the fifth input gear, and a second speed gear engaged with the sixth input gear are rotatably disposed on the first output shaft, and wherein a seventh speed gear engaged with the first input gear, a third speed gear engaged with the third input gear, and a sixth speed gear engaged with the fifth input gear are rotatably disposed on the second output shaft.

14. The power transmitting apparatus of claim 13, wherein the first synchronizer selectively connects the first/reverse speed gear or the fifth speed gear to the first output shaft.

15. The power transmitting apparatus of claim 13, wherein the second synchronizer selectively connects the fourth speed gear or the second speed gear to the first output shaft.

16. The power transmitting apparatus of claim 13, wherein the third synchronizer selectively connects the seventh speed gear or the third speed gear to the second output shaft.

17. The power transmitting apparatus of claim 13, wherein the fourth synchronizer selectively connects the sixth speed gear to the second output shaft.

18. A power transmitting apparatus for a hybrid electric vehicle comprising:
- an input device including a motor shaft selectively connected to an engine, a first input shaft selectively connected to the motor shaft and provided with at least one input gear fixedly disposed thereon, and a second input shaft disposed without rotational interference with the first input shaft and provided with at least one input gear fixedly disposed thereon;
- a motor/generator disposed on the motor shaft of the input device and operated as a motor or a generator;
- a selectively connecting device including a first clutch selectively connecting the motor shaft with the first input shaft, a second clutch selectively connecting the motor shaft with the second input shaft, and a third clutch selectively connecting the motor shaft with the engine; and
- a speed output device changing torque input from the first and second input shafts of the input device and outputting a changed torque,
- wherein a first input gear for achieving a seventh forward speed, a second input gear for achieving a first forward speed or a reverse speed, a third input gear for achieving a third forward speed, and a fourth input gear for achieving a fifth forward speed are fixedly disposed on the first input shaft, and
- wherein a fifth input gear for achieving a fourth forward speed or a sixth forward speed and a sixth input gear for achieving a second forward speed is fixedly disposed on the second input shaft.

* * * * *